US009753733B2

(12) United States Patent
Blasco-Allue et al.

(10) Patent No.: US 9,753,733 B2
(45) Date of Patent: Sep. 5, 2017

(54) METHODS, APPARATUS, AND PROCESSORS FOR PACKING MULTIPLE ITERATIONS OF LOOP IN A LOOP BUFFER

(75) Inventors: Conrado Blasco-Allue, Sunnyvale, CA (US); Ian D. Kountanis, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 683 days.

(21) Appl. No.: 13/524,478

(22) Filed: Jun. 15, 2012

(65) Prior Publication Data

US 2013/0339699 A1    Dec. 19, 2013

(51) Int. Cl.
- G06F 9/38    (2006.01)
- G06F 9/30    (2006.01)
- G06F 9/32    (2006.01)

(52) U.S. Cl.
CPC .......... *G06F 9/381* (2013.01); *G06F 9/30145* (2013.01); *G06F 9/30149* (2013.01); *G06F 9/325* (2013.01); *G06F 9/382* (2013.01); *G06F 9/3816* (2013.01); *G06F 9/3853* (2013.01)

(58) Field of Classification Search
CPC ...................................................... G06F 9/381
See application file for complete search history.

(56) References Cited

U.S. PATENT DOCUMENTS

| | | |
|---|---|---|
| 5,303,357 A | 4/1994 | Inoue et al. |
| 5,493,566 A | 2/1996 | Ljungberg et al. |
| 5,701,435 A | 12/1997 | Chi |
| 5,809,326 A | 9/1998 | Nogami |
| 5,893,142 A | 4/1999 | Moyer et al. |
| 5,951,679 A | 9/1999 | Anderson et al. |
| 6,052,776 A | 4/2000 | Miki et al. |
| 6,076,159 A | 6/2000 | Fleck et al. |
| 6,269,440 B1 * | 7/2001 | Fernando et al. ............ 712/241 |
| 6,671,799 B1 | 12/2003 | Parthasarathy |

(Continued)

FOREIGN PATENT DOCUMENTS

| | | |
|---|---|---|
| EP | 1107110 A2 | 6/2001 |
| GB | 2375852 | 11/2002 |

(Continued)

OTHER PUBLICATIONS

Panis, et al., "A Scalable Instruction Buffer and Align Unit for xDSPcore", IEEE Journal of Solid-State Circuits, IEEE Service Center, Piscataway, NJ, USA, vol. 39, No. 7, Jul. 1, 2004 (Jul. 1, 2004), pp. 1094-1100, XP001224111, ISSN: 0018-9200, DOI: 10.1109/JSSC.2004.829411.

(Continued)

*Primary Examiner* — Jacob A Petranek
(74) *Attorney, Agent, or Firm* — Rory D. Rankin; Meyertons, Hood, Kivlin, Kowert & Goetzel, P.C.

(57) ABSTRACT

Methods, apparatuses, and processors for packing multiple iterations of a loop in a loop buffer. A loop candidate that meets the criteria for buffering is detected in the instruction stream being executed by a processor. When the loop is being written to the loop buffer and the end of the loop is detected, another iteration of the loop is written to the loop buffer if the loop buffer is not yet halfway full. In this way, short loops are written to the loop buffer multiple times to maximize the instruction operations per cycle throughput out of the loop buffer when the processor is in loop buffer mode.

18 Claims, 11 Drawing Sheets

(56) References Cited

U.S. PATENT DOCUMENTS

| | | | |
|---|---|---|---|
| 6,748,523 B1 | 6/2004 | Singh et al. | |
| 6,950,929 B2 | 9/2005 | Chung et al. | |
| 6,959,379 B1 * | 10/2005 | Wojcieszak et al. | 712/241 |
| 6,963,965 B1 | 11/2005 | Anderson | |
| 7,278,013 B2 | 10/2007 | Booth | |
| 7,302,557 B1 * | 11/2007 | Hwu et al. | 712/241 |
| 7,873,820 B2 | 1/2011 | Knoth | |
| 2002/0178350 A1 | 11/2002 | Chung et al. | |
| 2003/0163679 A1 | 8/2003 | Ganapathy et al. | |
| 2004/0123075 A1 | 6/2004 | Almog | |
| 2004/0193858 A1 | 9/2004 | Ahmad et al. | |
| 2005/0015537 A1 | 1/2005 | Asaad et al. | |
| 2006/0095750 A1 | 5/2006 | Nye et al. | |
| 2006/0107028 A1 | 5/2006 | Meuwissen et al. | |
| 2006/0242394 A1 | 10/2006 | Uchiyama | |
| 2007/0113058 A1 * | 5/2007 | Tran et al. | 712/241 |
| 2007/0113059 A1 | 5/2007 | Tran | |
| 2007/0130450 A1 | 6/2007 | Chiao et al. | |
| 2009/0113192 A1 | 4/2009 | Hall et al. | |
| 2009/0217017 A1 | 8/2009 | Alexander et al. | |
| 2010/0064106 A1 | 3/2010 | Yamada et al. | |
| 2011/0107071 A1 | 5/2011 | Yaakov | |
| 2011/0252118 A1 | 10/2011 | Pantos et al. | |
| 2011/0298509 A1 | 12/2011 | Khoury et al. | |
| 2012/0079303 A1 | 3/2012 | Madduri | |
| 2012/0185714 A1 | 7/2012 | Chung et al. | |
| 2013/0339700 A1 | 12/2013 | Blasco-Allue et al. | |
| 2015/0227374 A1 | 8/2015 | Blasco et al. | |

FOREIGN PATENT DOCUMENTS

| | | |
|---|---|---|
| JP | S63314644 A | 12/1988 |
| JP | H04307624 A | 10/1992 |
| JP | H04307625 A | 10/1992 |
| JP | H0991136 A | 4/1997 |
| JP | H10154098 A | 6/1998 |
| JP | H10177482 A | 6/1998 |
| JP | 2000298587 A | 10/2000 |
| JP | 2001195302 A | 7/2001 |
| JP | 2002516425 A | 6/2002 |
| JP | 2004038601 A | 5/2004 |
| JP | 2010066892 A | 3/2010 |
| TW | I362001 | 4/2012 |
| WO | WO9960460 A2 | 11/1999 |
| WO | WO0237271 A2 | 5/2002 |

OTHER PUBLICATIONS

Extended Search Report in EP Application No. 13170364.7-1957, Oct. 22, 2013, pp. 1-8.
International Search Report and Written Opinion in application No. PCT/US2013/043328 mailed Dec. 16, 2013 pp. 1-10.
Extended Search Report in European Application No. 13171667.2, mailed Mar. 27, 2014, pp. 1-5.
Office Action in Japanese Patent Application No. 2013-125334, mailed Aug. 4, 2014, 12 pages.
Notice of Preliminary Rejection in Korean Patent Application No. 10-2013-68355, mailed Aug. 18, 2014, 10 pages.
Final Office Action in Japanese Patent Application No. 2013-125334, mailed Jan. 15, 2015, 10 pages.
Final Office Action in Japanese Patent Application No. 2013-125335, mailed Jan. 7, 2015, 4 pages.
Office Action in Japanese Patent Application No. 2013-125335, mailed Aug. 4, 2014, 4 pages.
Notice of Preliminary Rejection in Korean Patent Application No. 10-2013-68472, mailed Aug. 18, 2014, 10 pages.
ChiTa Wu, Ang-Chih Hsieh, and TingTing Hwang "Instruction Buffering for Nested Loops in Low-Power Design" IEEE Transactions on Very Large Scale Integration (VLSI) Systems, vol. 14, No. 7, Jul. 2006; Publisher: Institute of Electrical and Electronics Engineers Inc. pp. 1-5.
International Search Report and Written Opinion in application No. PCT/US2013/043335 mailed Dec. 13, 2013 pp. 1-12.
Zuluaga et al. "Introducing Control-Flow Inclusion to Support Pipelining in Custom Instruction Set Extensions." In: Symposium on Application Specific Processors. Jul. 28, 2009 (Jul. 28, 2009). [Retrieved on Dec. 1, 2013]. Retrieved from the Internet: <URL: http://www1.cs.ucr.edu/faculty/philip/papers/conferences/sasp09/sasp09-ise.pdf>, entire document.
Notification of the First Office Action in Chinese Application No. 201310353450.4, mailed May 6, 2015, 26 pages.
Non-Final Office Action in U.S. Appl. No. 13/524,508, mailed Apr. 7, 2015, 19 pages.
Notification of the Second Office Action in Chinese Application No. 201310233540.X, mailed Mar. 4, 2016, 7 pages.
Non-Final Office Action in U.S. Appl. No. 14/179,204, mailed Feb. 10, 2016, 7 pages.
Final Office Action in U.S. Appl. No. 13/524,508, mailed Aug. 18, 2015, 18 pages.
Notification of the First Office Action in Chinese Application No. 201310233540.X, mailed Jul. 1, 2015, 18 pages.
Office Action in Taiwan Patent Application No. 102121215, mailed Jul. 22, 2015, 12 pages.
Notification of the Third Office Action in Chinese Application No. 201310233540.X, mailed Jun. 14, 2016, 7 pages.
Office Action in Taiwan Patent Application No. 102121212, mailed Feb. 25, 2015, 15 pages.
Communication pursuant to Article 94(3) EPC in European Application No. 13171667.2, mailed Mar. 3, 2015, 5 pages.
Communication pursuant to Article 94(3) EPC in European Application No. 13171667.2, mailed Mar. 9, 2017, 4 pages.

* cited by examiner

METHODS, APPARATUS, AND PROCESSORS FOR PACKING MULTIPLE ITERATIONS OF LOOP IN A LOOP BUFFER

BACKGROUND

Field of the Invention

The present invention relates generally to processors, and in particular to methods and mechanisms for packing multiple iterations of a loop in a loop buffer.

Description of the Related Art

Modern day processor systems tend to be structured in multiple stages in a pipelined fashion. Typical pipelines often include separate units for fetching instructions, decoding instructions, mapping instructions, executing instructions, and then writing results to another unit, such as a register. An instruction fetch unit of a microprocessor is responsible for providing a constant stream of instructions to the next stage of the processor pipeline. Typically, fetch units utilize an instruction cache in order to keep the rest of the pipeline continuously supplied with instructions. The fetch unit and instruction cache tend to consume a significant amount of power while performing their required functions. It is a goal of modern microprocessors to reduce power consumption as much as possible, especially for microprocessors that are utilized in battery-powered mobile devices.

In many software applications, the same software steps may be repeated many times to perform a specific function or task. In these situations, the fetch unit will continue to fetch instructions and consume power even though the same loop of instructions are continuously being executed. If the loop could be detected and cached in a loop buffer, then the fetch unit could be shutdown to reduce power consumption while the loop executes. However, it may be challenging to maximize instruction throughput in the processor pipeline while the loop buffer is being used. This may result in the processor operating at less than full efficiency.

SUMMARY

Apparatuses, processors and methods for maximizing instructions per cycle throughput out of a loop buffer are disclosed. In order to maximize the instructions per cycle throughput, the loop buffer may be packed with multiple iterations of a loop. In one embodiment, the front end of a processor pipeline may include a fetch unit, loop buffer and a loop buffer control unit. The loop buffer control unit may monitor and track loop candidates and determine which loop candidates should be cached in the loop buffer.

In one embodiment, when a loop candidate meets the criteria for caching, the loop buffer control unit may signal back to the fetch unit that the start of the loop needs to be written to the first slot of the loop buffer. In the fetch unit, the backwards taken branch of the loop candidate may be identified and marked. Then, the next instruction may be identified and marked as the start of the loop. When the fetch unit receives the signal from the loop buffer control unit that the loop candidate should be cached in the loop buffer, the fetch unit may artificially stall after the backwards taken branch. Then, on the next clock cycle, the fetch unit may output the instruction identified as the start of the loop into the first slot of the loop buffer. Also, at the end of the last iteration of the loop being written to the loop buffer, when the backwards taken branch is encountered, the fetch unit may artificially stall after the backwards taken branch is written to the loop buffer.

In one embodiment, when the backwards taken branch of a loop iteration is written to the loop buffer, it may be determined if the loop buffer is at least halfway full. If the loop buffer is not halfway full, then another iteration of the loop may be written to the loop buffer. If the loop buffer is halfway full, then writing to the loop buffer may be terminated. After writing to the loop buffer is completed, the iteration(s) of the loop may be dispatched out of the loop buffer to the next stage of the processor pipeline.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

Figure 1:
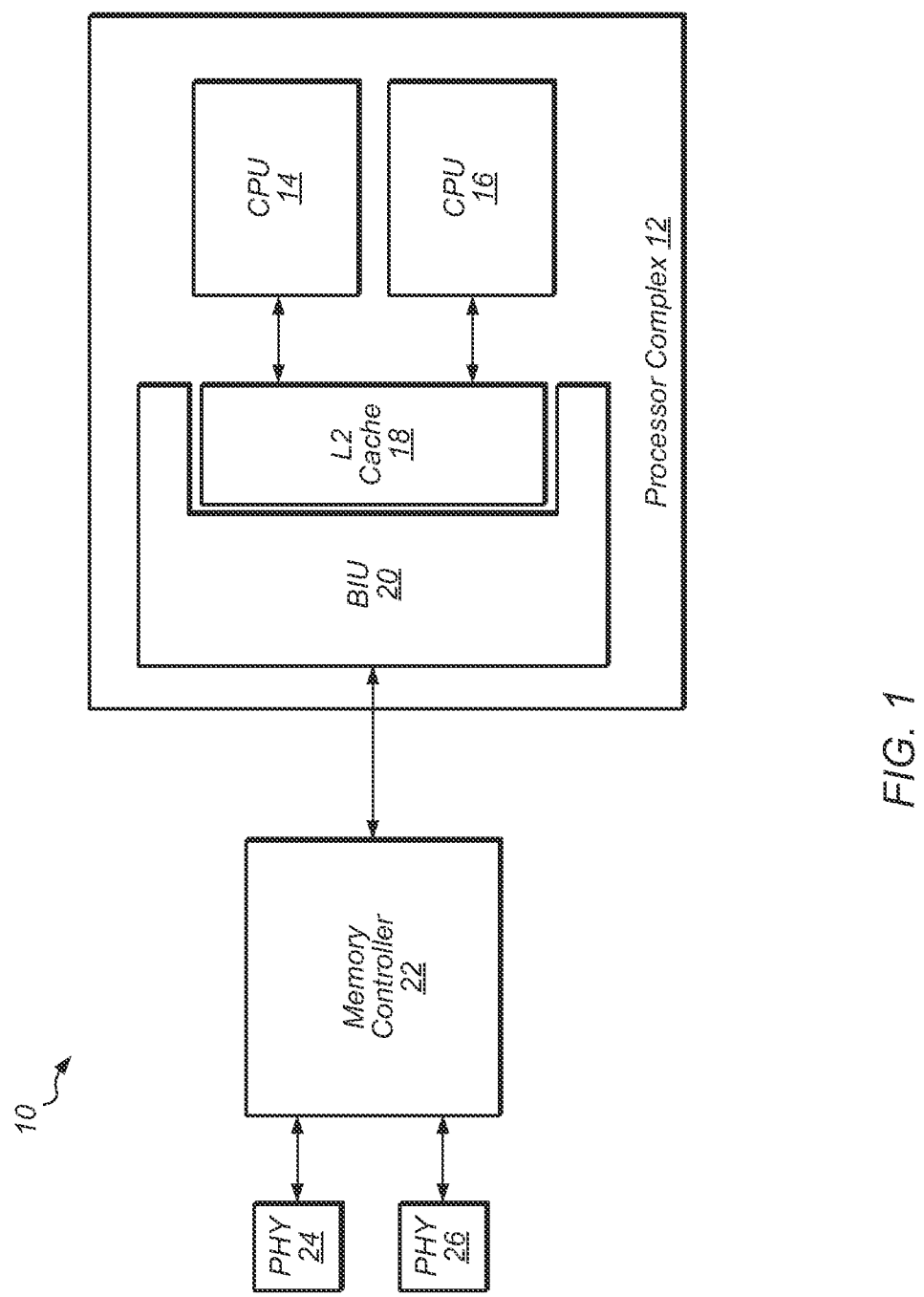
FIG. 1 illustrates one embodiment of a portion of an integrated circuit.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A processor comprising a loop buffer control unit . . . ." Such a claim does not foreclose the processor from including additional components (e.g., a cache, a fetch unit, an execution unit).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, a block diagram illustrating one embodiment of a portion of an integrated circuit (IC) is shown. In the illustrated embodiment, IC 10 includes a processor complex 12, memory controller 22, and memory physical interface circuits (PHYs) 24 and 26. It is noted that IC 10 may also include many other components not shown in FIG. 1. In various embodiments, IC 10 may also be referred to as a system on chip (SoC), an application specific integrated circuit (ASIC), or an apparatus.

Processor complex 12 may include central processing units (CPUs) 14 and 16, level two (L2) cache 18, and bus interface unit (BIU) 20. In other embodiments, processor complex 12 may include other numbers of CPUs. CPUs 14 and 16 may also be referred to as processors or cores. It is noted that processor complex 12 may include other components not shown in FIG. 1.

The CPUs 14 and 16 may include circuitry to execute instructions defined in an instruction set architecture. Specifically, one or more programs comprising the instructions may be executed by CPUs 14 and 16. Any instruction set architecture may be implemented in various embodiments. For example, in one embodiment, the ARM™ instruction set architecture (ISA) may be implemented. The ARM instruction set may include 16-bit (or Thumb) and 32-bit instructions. Other exemplary ISA's may include the PowerPC™ instruction set, the MIPS™ instruction set, the SPARC™ instruction set, the x86 instruction set (also referred to as IA-32), the IA-64 instruction set, etc.

In one embodiment, each instruction executed by CPUs 14 and 16 may be associated with a program counter (PC) value. Also, one or more architectural registers may be specified within some instructions for reads and writes. These architectural registers may be mapped to actual physical registers by a register rename unit. Furthermore, some instructions (e.g., ARM Thumb instructions) may be broken up into a sequence of instruction operations (or micro-ops), and each instruction operation of the sequence may be referred to by a unique micro-op (or uop) number.

Each of CPUs 14 and 16 may also include a level one (L1) cache (not shown), and each L1 cache may be coupled to L2 cache 18. Other embodiments may include additional levels of cache (e.g., level three (L3) cache). In one embodiment, L2 cache 18 may be configured to cache instructions and data for low latency access by CPUs 14 and 16. The L2 cache 18 may comprise any capacity and configuration (e.g. direct mapped, set associative). L2 cache 18 may be coupled to memory controller 22 via BIU 20. BIU 20 may also include various other logic structures to couple CPUs 14 and 16 and L2 cache 18 to various other devices and blocks.

Memory controller 22 may include any number of memory ports and may include circuitry configured to interface to memory. For example, memory controller 22 may be configured to interface to dynamic random access memory (DRAM) such as synchronous DRAM (SDRAM), double data rate (DDR) SDRAM, DDR2 SDRAM, Rambus DRAM (RDRAM), etc. Memory controller 22 may also be coupled to memory physical interface circuits (PHYs) 24 and 26. Memory PHYs 24 and 26 are representative of any number of memory PHYs which may be coupled to memory controller 22. Memory PHYs 24 and 26 may be configured to interface to memory devices (not shown).

It is noted that other embodiments may include other combinations of components, including subsets or supersets of the components shown in FIG. 1 and/or other components. While one instance of a given component may be shown in FIG. 1, other embodiments may include two or more instances of the given component. Similarly, throughout this detailed description, two or more instances of a given component may be included even if only one is shown, and/or embodiments that include only one instance may be used even if multiple instances are shown.

Figure 2:
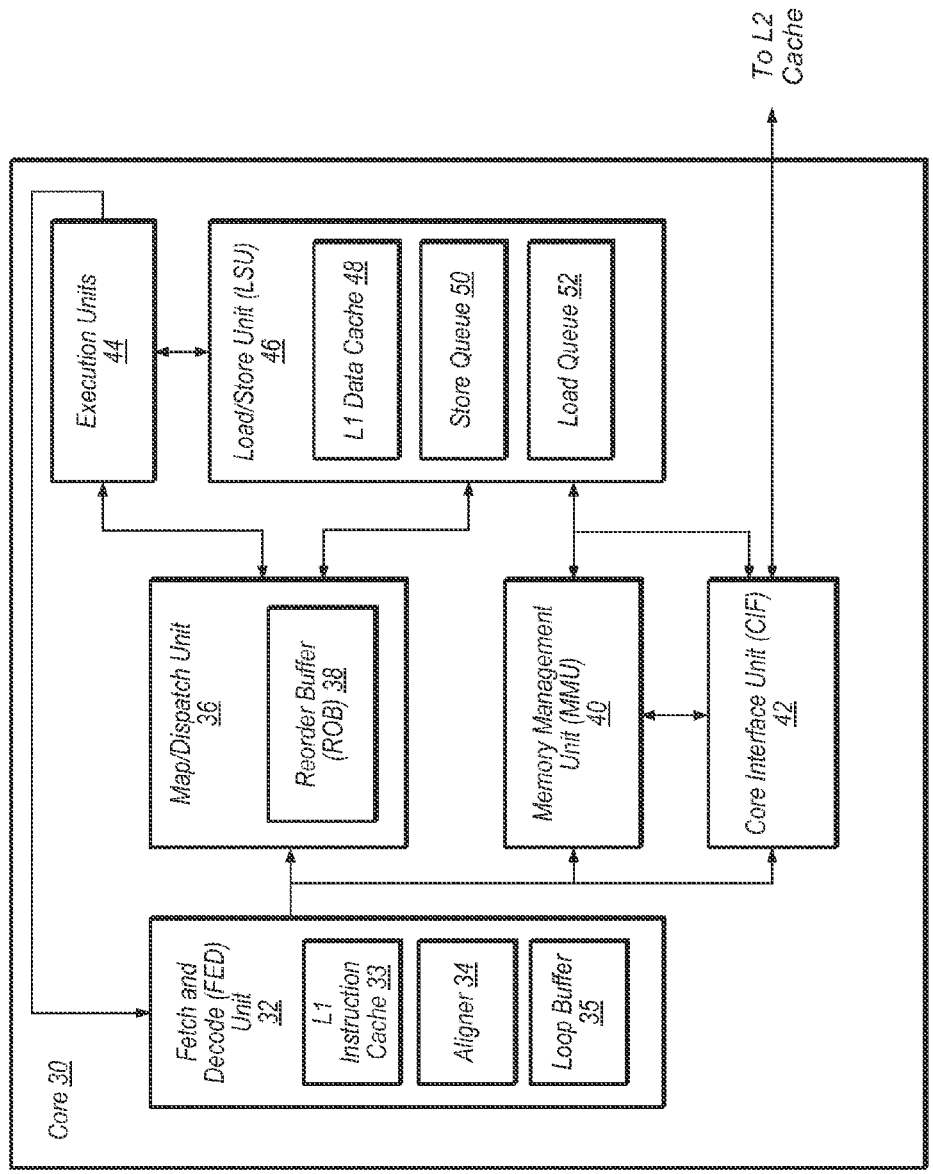
FIG. 2 is a block diagram that illustrates one embodiment of a processor core.

Turning now to FIG. 2, one embodiment of a processor core is shown. Core 30 is one example of a processor core, and core 30 may be utilized within a processor complex, such as processor complex 12 of FIG. 1. In one embodiment, each of CPUs 14 and 16 of FIG. 1 may include the components and functionality of core 30. Core 30 may include fetch and decode (FED) unit 32, map and dispatch unit 36, memory management unit (MMU) 40, core interface unit (CIF) 42, execution units 44, and load-store unit (LSU) 46. It is noted that core 30 may include other components and interfaces not shown in FIG. 2.

FED unit 32 may include circuitry configured to read instructions from memory and place them in level one (L1) instruction cache 33. L1 instruction cache 33 may be a cache memory for storing instructions to be executed by core 30. L1 instruction cache 33 may have any capacity and construction (e.g. direct mapped, set associative, fully associative, etc.). Furthermore, L1 instruction cache 33 may have any cache line size. FED unit 32 may also include branch prediction hardware configured to predict branch instructions and to fetch down the predicted path. FED unit 32 may also be redirected (e.g. via misprediction, exception, interrupt, flush, etc.).

In one embodiment, FED unit 32 may be configured to decode the instructions into instruction operations in multiple steps. In addition, FED unit 32 may also be configured to decode multiple instructions in parallel. More specifically, instructions may be pulled out of L1 instruction cache 33 and decoded into pre-decoded instructions, and aligner 34 may be configured to deliver the pre-decoded instructions to the proper lanes of loop buffer 35 and/or decoder units (not shown). The decoder units may be configured to perform the remainder of the decoding to convert the pre-decoded instructions into instruction operations.

Generally, an instruction operation may be an operation that the hardware included in execution units 44 and LSU 46 is capable of executing. Each instruction may translate to one or more instruction operations which, when executed, result in the performance of the operations defined for that instruction according to the instruction set architecture. It is noted that the terms "instruction operation" and "uop" may be used interchangeably throughout this disclosure. In other embodiments, the functionality included within FED unit 32 may be split into two or more separate units, such as a fetch unit, a decode unit, and/or other units.

In various ISA's, some instructions may decode into a single uop. FED unit 32 may be configured to identify the type of instruction, source operands, etc., and each decoded instruction operation may comprise the instruction along with some of the decode information. In other embodiments in which each instruction translates to a single uop, each uop may simply be the corresponding instruction or a portion thereof (e.g., the opcode field or fields of the instruction). In some embodiments, the FED unit 32 may include any combination of circuitry and/or microcode for generating uops for instructions. For example, relatively simple uop generations (e.g., one or two uops per instruction) may be handled in hardware while more extensive uop generations (e.g., more than three uops for an instruction) may be handled in microcode.

Decoded uops may be provided to map/dispatch unit 36. Map/dispatch unit 36 may be configured to map uops and architectural registers to physical registers of core 30. Map/dispatch unit 36 may implement register renaming to map source register addresses from the uops to the source operand numbers identifying the renamed source registers. Map/dispatch unit 36 may also be configured to dispatch uops to reservation stations (not shown) within execution units 44 and LSU 46.

In one embodiment, map/dispatch unit 36 may include reorder buffer (ROB) 38. In other embodiments, ROB 38 may be located elsewhere. Prior to being dispatched, the uops may be written to ROB 38. ROB 38 may be configured to hold uops until they can be committed in order. Each uop may be assigned a ROB index (RNUM) corresponding to a specific entry in ROB 38. RNUMs may be used to keep track of the operations in flight in core 30. Map/dispatch unit 36 may also include other components (e.g., mapper array, dispatch unit, dispatch buffer) not shown in FIG. 2. Furthermore, in other embodiments, the functionality included within map/dispatch unit 36 may be split into two or more separate units, such as a map unit, a dispatch unit, and/or other units.

Execution units 44 may include any number and type of execution units (e.g., integer, floating point, vector). Each of execution units 44 may also include one or more reservation stations (not shown). CIF 42 may be coupled to LSU 46, FED unit 32, MMU 40, and an L2 cache (not shown). CIF 42 may be configured to manage the interface between core 30 and the L2 cache. MMU 40 may be configured to perform address translation and memory management functions.

LSU 46 may include L1 data cache 48, store queue 50, and load queue 52. Load and store operations may be dispatched from map/dispatch unit 36 to reservation stations within LSU 46. Store queue 50 may store data corresponding to store operations, and load queue 52 may store data associated with load operations. LSU 46 may also be coupled to the L2 cache via CIF 42. It is noted that LSU 46 may also include other components (e.g., reservation stations, register file, prefetch unit, translation lookaside buffer) not shown in FIG. 2.

It should be understood that the distribution of functionality illustrated in FIG. 2 is not the only possible microarchitecture which may be utilized for a processor core. Other processor cores may include other components, omit one or more of the components shown, and/or include a different arrangement of functionality among the components.

Figure 3:
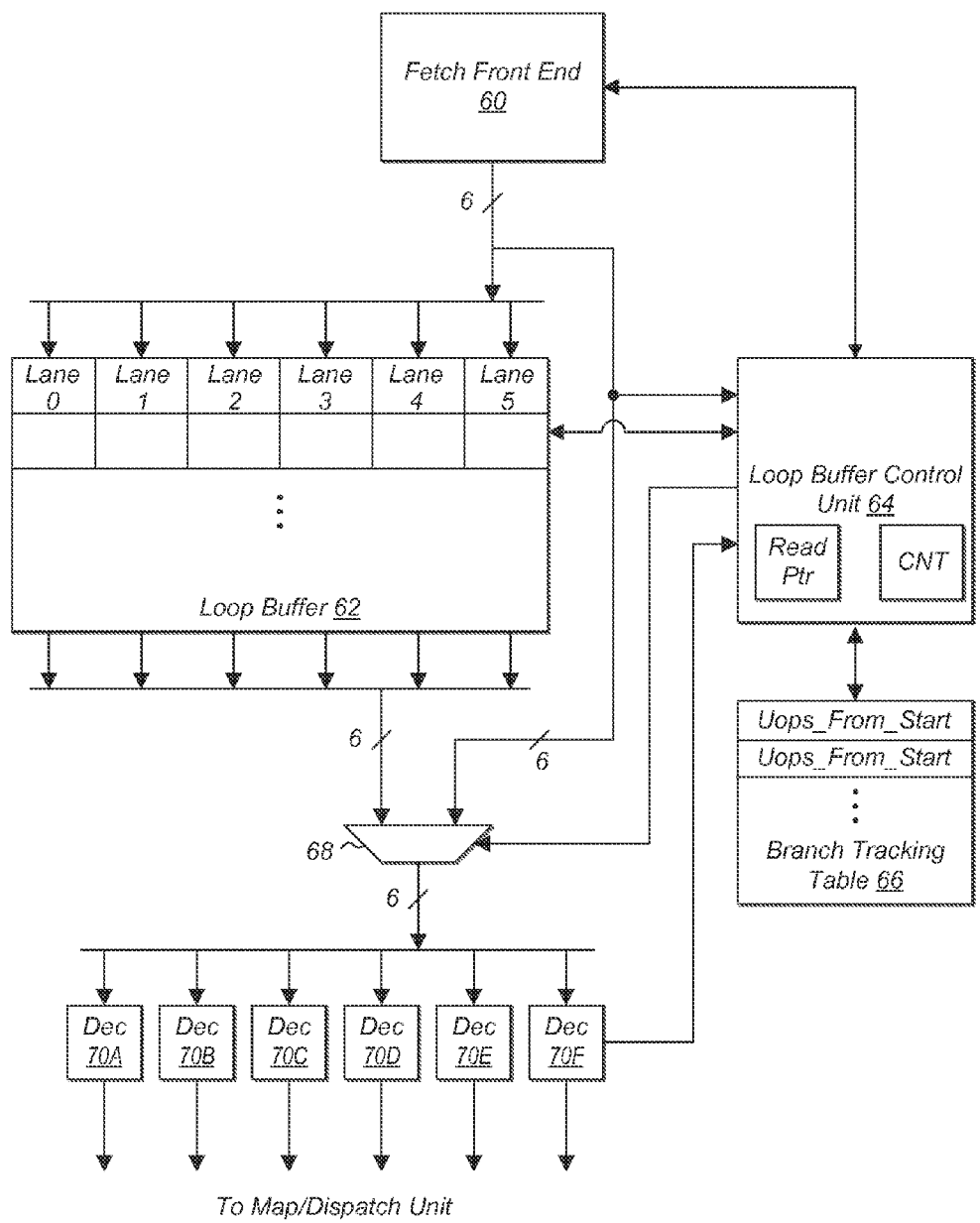
FIG. 3 is a block diagram illustrating one embodiment of a front end of a processor pipeline.

Referring now to FIG. 3, a block diagram of one embodiment of a front end of a processor pipeline is shown. In one embodiment, the front end logic shown in FIG. 3 may be located within a fetch and decode unit, such as FED Unit 32 (of FIG. 2). It should be understood that the distribution of functionality illustrated in FIG. 3 is only one possible structure to implement a loop buffer within a processor pipeline. Other suitable distributions of logic for implementing a loop buffer are possible and are contemplated.

Fetch front end 60 may be configured to fetch and pre-decode instructions and then convey pre-decoded uops to loop buffer 62 and the decoders 70A-F (via multiplexer 68). In one embodiment, fetch front end 60 may be configured to output six pre-decoded uops per cycle. In other embodiments, fetch front end 60 may be configured to output other numbers of pre-decoded uops per cycle.

Loop buffer 62, multiplexer 68, and decoder 70A-F may have six lanes for processing and/or storing six uops per cycle. Each lane may include a valid bit to indicate if the lane contains a valid uop. It is noted that the "lanes" of loop buffer 62, multiplexer 68, and decoder 70A-F may also be referred to as "slots" or "entries". In other embodiments, loop buffer 62, multiplexer 68, and decoder 70A-F may include more or fewer than six lanes, and fetch front end 60 may be configured to output as many uops per cycle as may be accommodated by the next stage of the pipeline.

Fetch front end 60 may grab raw instruction data from the instruction cache (not shown), detect instruction boundaries in the data, buffer the instructions in an instruction cache buffer (not shown) and/or aligner (not shown), expand instructions into sets of up to six uops, and generate the appropriate payload for these uops. Each set of up to six uops may be referred to as a "decode group". In other embodiments, a decode group may include other numbers of uops. A decode group may be delivered to the lanes of loop buffer 62 and multiplexer 68 in each clock cycle. As used herein, a "lane" may be defined as a pathway including logic that is configured to process and/or store a uop in each clock cycle.

Fetch front end 60 may expand instructions into uops and feed these uops to loop buffer 62 and multiplexer 68. In one embodiment, the instructions fetched by fetch front end 60 and decoded into pre-decoded uops may be based on the ARM ISA. Each pre-decoded uop may include instruction opcode bits, instruction predecode bits, and a uop number. The instruction opcode bits specify the operation that is to be performed. The predecode bits indicate the number of uops that the instruction maps to. The uop number represents which uop in a multi-uop instruction sequence should be generated. In other embodiments, other ISAs may be utilized, and the instructions may be decoded and formatted in a variety of manners.

When the processor is not in loop buffer mode, then the pre-decoded uops generated by fetch front end 60 may be conveyed to decoders 70A-F via multiplexer 68. A select signal from loop buffer control unit 64 may be coupled to multiplexer 68 to determine which path is coupled through multiplexer 68 to the inputs of decoders 70A-F. When the processor is in loop buffer mode, pre-decoded uops may be read out of loop buffer 62 and conveyed to decoders 70A-F. The pre-decoded uops may be decoded and then conveyed from the outputs of decoders 70A-F to the next stage of the processor pipeline. In one embodiment, the next stage of the processor pipeline may be a map/dispatch unit, such as map/dispatch unit 36 of FIG. 2.

Loop buffer control unit 64 may be configured to identify a loop within the fetched and pre-decoded instructions. Once a loop has been identified with some degree of certainty, then loop buffer control unit 64 may cause the loop to be cached in loop buffer 62, fetch front end 60 may be shutdown, and then the rest of the processor pipeline may be fed from loop buffer 62. Multiple iterations of the loop may be cached in loop buffer 62, and these cached iterations may be repeatedly dispatched down the pipeline. When writing iterations of the loop to loop buffer 62, loop buffer control unit 64 may utilize a write pointer to determine which row is being written to in loop buffer 62. Similarly, when reading from loop buffer 62, a read pointer ("Read Ptr") may be utilized to point to the current row that is being read from.

To identify a loop for caching, first a backwards taken branch may be detected among the fetched instructions. A "backwards taken branch" may be defined as a taken branch that branches to a previous instruction in the instruction sequence. The instruction to which the backwards taken branch goes to may be considered the start of the loop. In one embodiment, only certain types of loops may be considered as candidates for buffering. For example, in one embodiment, for a loop candidate to be considered for buffering, all of the iterations of the loop should be invariant.

Loop buffer control unit 64 may monitor the instruction stream for instructions that form loops that meet the criteria for loop buffering. Loop buffer control unit 64 may capture all of the information of what a given loop candidate looks like. For a certain period of time, the loop candidate may be tracked over multiple iterations to make sure that the loop candidate stays the same. For example, the distances from the start of the loop to one or more instructions within the loop may be recorded on a first iteration and monitored on subsequent iterations to determine if these distances remain the same.

In some embodiments, even if the loop candidate is invariant and meets the other criteria listed above, other characteristics of the loop candidate may disqualify it from being cached in loop buffer 62. For example, if the size of the loop candidate is too large to fit in loop buffer 62, then the loop candidate may be disqualified. Also, there may be a maximum allowable number of taken branches within the loop, equal to the size of branch tracking table 66. If the number of taken branches exceeds this number, then the loop may be excluded from consideration as a candidate for caching in loop buffer 62. In one embodiment, branch tracking table 66 may include eight entries for taken branches within a loop. In other embodiments, branch tracking table 66 may have more or less than eight entries for taken branches within a loop.

In one embodiment, once the same backwards taken branch has been detected more than once, then a state machine to capture the information for that loop may be started by loop buffer control unit 64. For example, loop buffer control unit 64 may utilize branch tracking table 66 to track the taken branches of a loop candidate. Branch tracking table 66 may keep track of the distance from the start of the loop to each taken branch.

If each iteration of the loop executes such that there are the same number of uops from the start of the loop to each branch, then the loop candidate may be considered invariant. The distance to each branch in table 66 may be tracked for a certain number of iterations before determining the loop candidate is invariant and should be cached. The amount of time allocated for tracking the invariance of the loop candidate may be based on a number of loop iterations and/or on a number of branches encountered.

Figure 4:
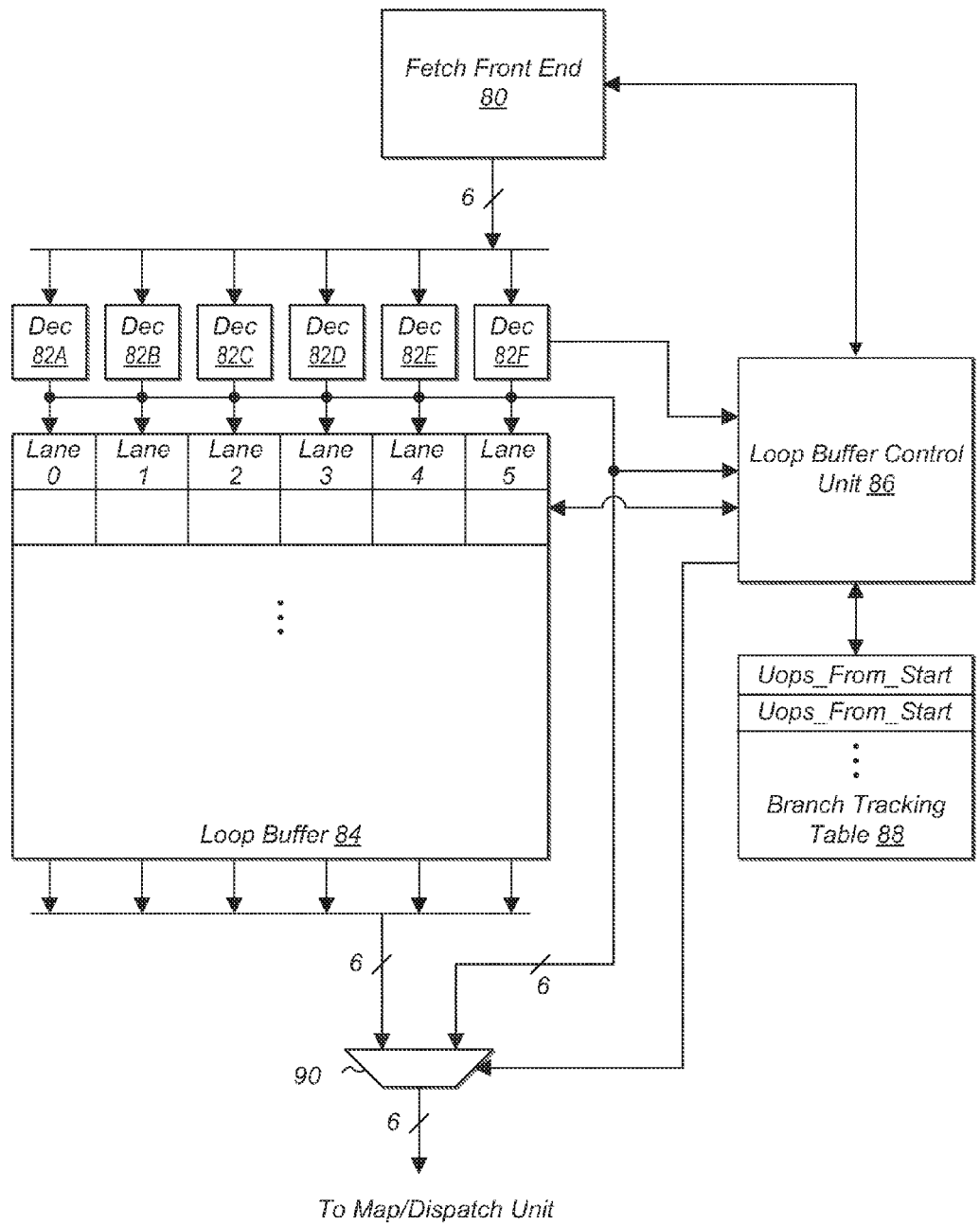
FIG. 4 illustrates a block diagram of another embodiment of a loop buffer within a fetch and decode unit.

Turning now to FIG. 4, another embodiment of a loop buffer within a fetch and decode unit is shown. In one embodiment, loop buffer 84 may be located downstream from decoders 82A-F in the processor pipeline, as shown in FIG. 4. This is in contrast to loop buffer 62 (of FIG. 3) which is located in the processor pipeline upstream from decoders 70A-F. In one embodiment, loop buffer 84 may be organized into rows and columns (or lanes). In one embodiment, loop buffer 84 may have 16 rows and 6 columns. In other embodiments, loop buffer 84 may include other numbers of rows and columns.

Fetch front-end 80 may fetch instructions and pre-decode the fetched instructions into pre-decoded uops. Then, the pre-decoded uops may be conveyed to decoders 82A-F. In one embodiment, fetch front-end 80 may be configured to generate and convey six pre-decoded uops per cycle to the six lanes of decoders 82A-F. Decoders 82A-F may decode the pre-decoded uops into decoded uops. Then, decoders 82A-F may convey the decoded uops to the next stage of the processor pipeline via multiplexer 90. Also, decoders 82A-F may convey uops to loop buffer 84 when a loop candidate has been identified and has met the criteria for being cached into loop buffer 84. The outputs of multiplexer 90 may be coupled to the next stage of the processor pipeline. In one embodiment, the next stage of the processor pipeline may be a map/dispatch unit.

Loop buffer 84, loop buffer control unit 86, and branch tracking table 88 may be configured to perform functions similar to those described in relation to the processor front end shown in FIG. 3. One key difference in FIG. 4 is that loop buffer 84 may store decoded uops as opposed to loop buffer 62 storing pre-decoded uops in FIG. 3. Therefore, loop buffer 84 may be of larger size than loop buffer 62 to accommodate the larger amount of data, since decoded uops typically have more information than pre-decoded uops. It is noted that loop buffer 84 may also be located at other locations within a processor pipeline, in addition to the two locations shown in FIGS. 3 and 4. For example, loop buffer 84 may be located within a fetch front end, or alternatively, loop buffer 84 may be located within a map/dispatch unit. Depending on where the loop buffer is located in the pipeline, the contents of the loop that are stored in the loop buffer may vary based on the amount of instruction processing that has been performed at that point in the pipeline.

In one embodiment, on an initial iteration of a loop candidate, loop buffer control unit 86 may populate branch tracking table 88 with the distance from the start of the loop to each taken branch of the loop. On subsequent iterations of the loop, control unit 86 may determine if each branch is the same distance from the start of the loop as the corresponding distance stored in table 88. After a loop candidate has been invariant for a certain number of iterations, then the loop candidate may be cached in loop buffer 84 and fed to the rest of the pipeline from loop buffer 84. Fetch front end 80 and decoders 82A-F may be powered down while the loop is being dispatched out of loop buffer 84 to the rest of the processor pipeline.

Figure 5:
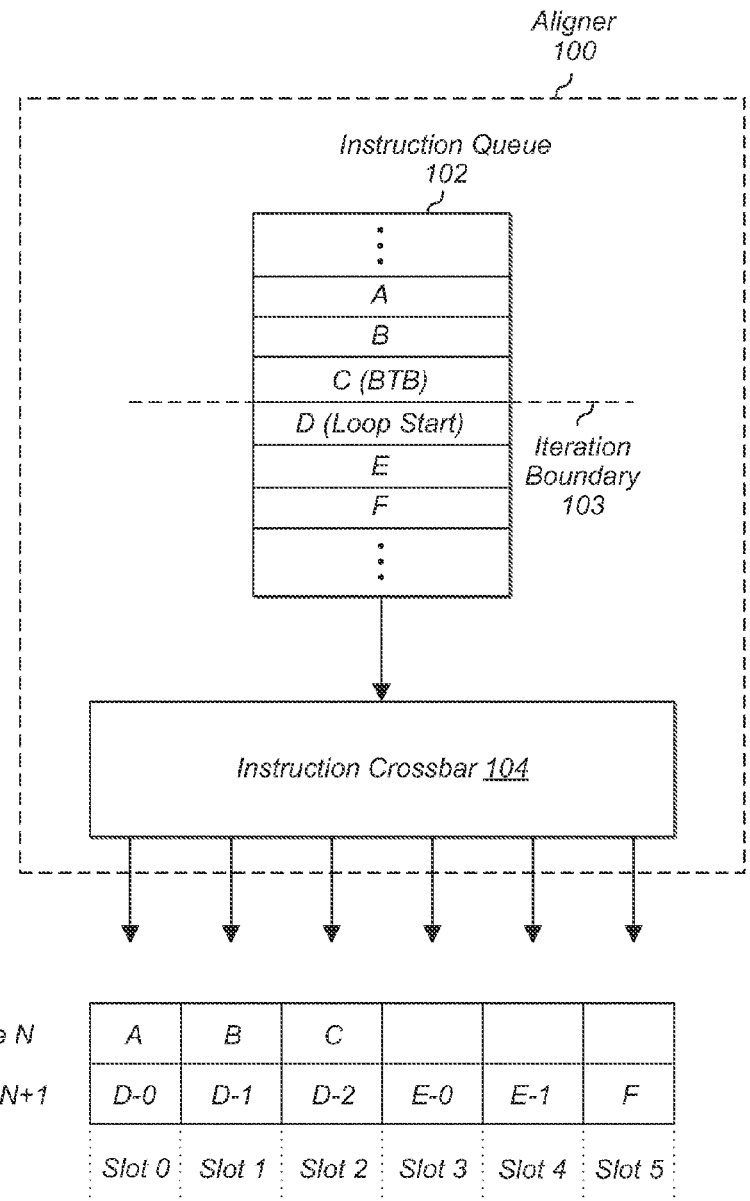
FIG. 5 is one embodiment of an aligner.

Referring now to FIG. 5, one embodiment of an aligner is shown. Aligner 100 may be part of a fetch unit, and aligner 100 may include instruction queue 102 and instruction crossbar 104. The instruction boundaries may be detected within instruction data in the instruction cache (not shown), and then the instructions may be conveyed to instruction queue 102. Instruction queue 102 may have any capacity and construction. Aligner 100 may be configured to keep the decoder units supplied with the appropriate number of pre-decoded instructions each clock cycle, wherein the appropriate number is based on the processor architecture. For example, in one embodiment, there may be six decoders, and so aligner 100 may be configured to generate and convey up to six pre-decoded uops per clock cycle to the six decoders. In other embodiments, aligner 100 may be configured to generate other numbers of pre-decoded uops per clock cycle.

Each clock cycle, aligner 100 may look at the instructions in instruction queue 102 that correspond to the next six uops in the instruction sequence. Aligner 100 may assign these instructions to the proper decoder slots via instruction crossbar 104. Aligner 100 may also be configured to identify the boundaries of loop iterations (e.g., iteration boundary 103). For example, when a loop candidate meets the criteria for caching, then the backwards taken branch (BTB), instruction C, of the most recent iteration may be identified.

In the example shown in FIG. 5, the instructions shown in instruction queue 102 include instructions A, B, C (BTB), D, E, and F. Since instruction D follows the BTB, then D may be marked as the start of the loop. Each instruction may be cracked into one or more uops, and the number of uops that an instruction maps to may be predecoded when instructions are filled into the instruction cache. When it is determined that the loop should be cached in the loop buffer (not shown), the loop buffer control unit (not shown) may send a signal to aligner 100 to stall after the BTB of the loop.

As shown in FIG. 5, aligner 100 may write only three uops to the decoder slots in the clock cycle 'N'. These three uops are A, B, and C (the BTB). Each of the instructions A, B, and C are single uop instructions in this example. As can be seen in clock cycle 'N', slots 3-5 are empty since the BTB (instruction C) is assigned to slot 2. Aligner 100 stalls after the BTB is assigned to a decoder slot, and then the remainder of the slots are unfilled for clock cycle 'N'. On the next clock cycle, aligner 100 assigns the start of the loop to slot 0. Instruction D is the start of the loop and instruction D is a three-uop instruction in this example, so the corresponding three uops (D-0, D-1, and D-2) are assigned to decoder slots 0-2 in clock cycle 'N+1'. The two uops corresponding to instruction E take up slots 3 and 4, and the uop corresponding to instruction F may be assigned to slot 5 in clock cycle 'N+1'.

The uops shown in clock cycles 'N' and 'N+1' may be conveyed to both the decoder units and to the loop buffer. While the loop is being written to the loop buffer, the loop may continue to be fed to the next stage (e.g., decoders) of the pipeline. After the one or more iterations of the loop are written to the loop buffer, then the backend of the pipeline may be fed by the loop buffer and the front end may be powered down.

Aligner 100 may also stall in a similar manner at the end of the last iteration of the loop which is written to the loop buffer. Whatever slot the BTB is assigned to will be the last slot written to within that row in the loop buffer. For example, if the BTB is written to slot 1 in the last clock cycle of writing the final loop iteration to the loop buffer, then the remainder of the slots (slots 2-5) may be left empty. In this way, there may be a clean handoff on the next clock cycle when the loop is read out of the loop buffer starting with the first uop of the first iteration of the loop located in slot 0 of the first row of the loop buffer.

Figure 6:
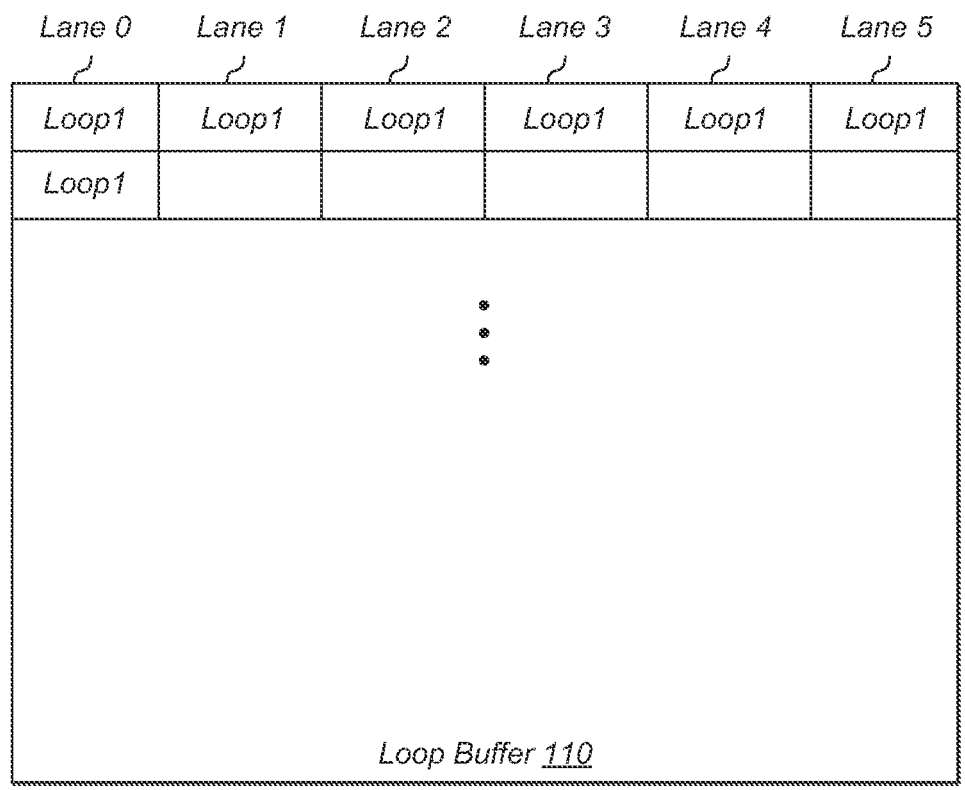
FIG. 6 illustrates one embodiment of a loop cached in a loop buffer.

Referring now to FIG. 6, one embodiment of a single iteration of a loop packed into a loop buffer is shown. The loop may be a seven uop loop in this example, with each uop labeled "Loop1" in loop buffer 110. It is noted that this is merely one example of a loop, and other loops may include other numbers of uops. It is also noted that loop buffer 110 may be located at any of various locations within a processor pipeline, with two examples of locations shown in FIG. 3 and FIG. 4. While loop buffer 110 is shown as including six lanes (labeled 0-5), it is noted that other loop buffers may have other numbers of lanes. It is also noted that the "lanes" of loop buffer 110 may also be referred to as "slots" or "columns".

The first six uops of Loop1 may be written to the first row of loop buffer 110. The last uop, which corresponds to the backwards taken branch, may fill the first entry of the second row of loop buffer 110. For this loop, it will take two cycles to dispatch the loop to the next stage of the processor pipeline, and the average uops per cycle output will be 3.5 (seven uops in two clock cycles). This is far less than the maximum possible uops per cycle throughput of six uops per cycle. To improve the uops per cycle throughput, more than one iteration of the loop may be written to loop buffer 110, which will be described in more detail below.

In other embodiments, loop buffer 110 may include other numbers of lanes besides six. For example, in another embodiment, loop buffer 110 may have eight lanes. In this embodiment, a loop of nine uops would have an inefficient uops per cycle throughput when this nine-uop loop is dispatched from loop buffer 110. The instructions per cycle would average 4.5 in this example, with nine uops being dispatched every two clock cycles. This would be far below a maximum possible uops per cycle throughput of eight for this embodiment.

In various embodiments, different formats of instructions may be stored in loop buffer 110. The different formats that are utilized may include instructions, instruction operations, pre-decoded uops, decoded uops, uops, ops, or other formats. The terms "instructions per cycle", "instruction operations per cycle", and "uops per cycle" may be used to describe throughput generally, and it is to be understood that these terms may refer to any of a variety of instruction formats.

Figure 7:
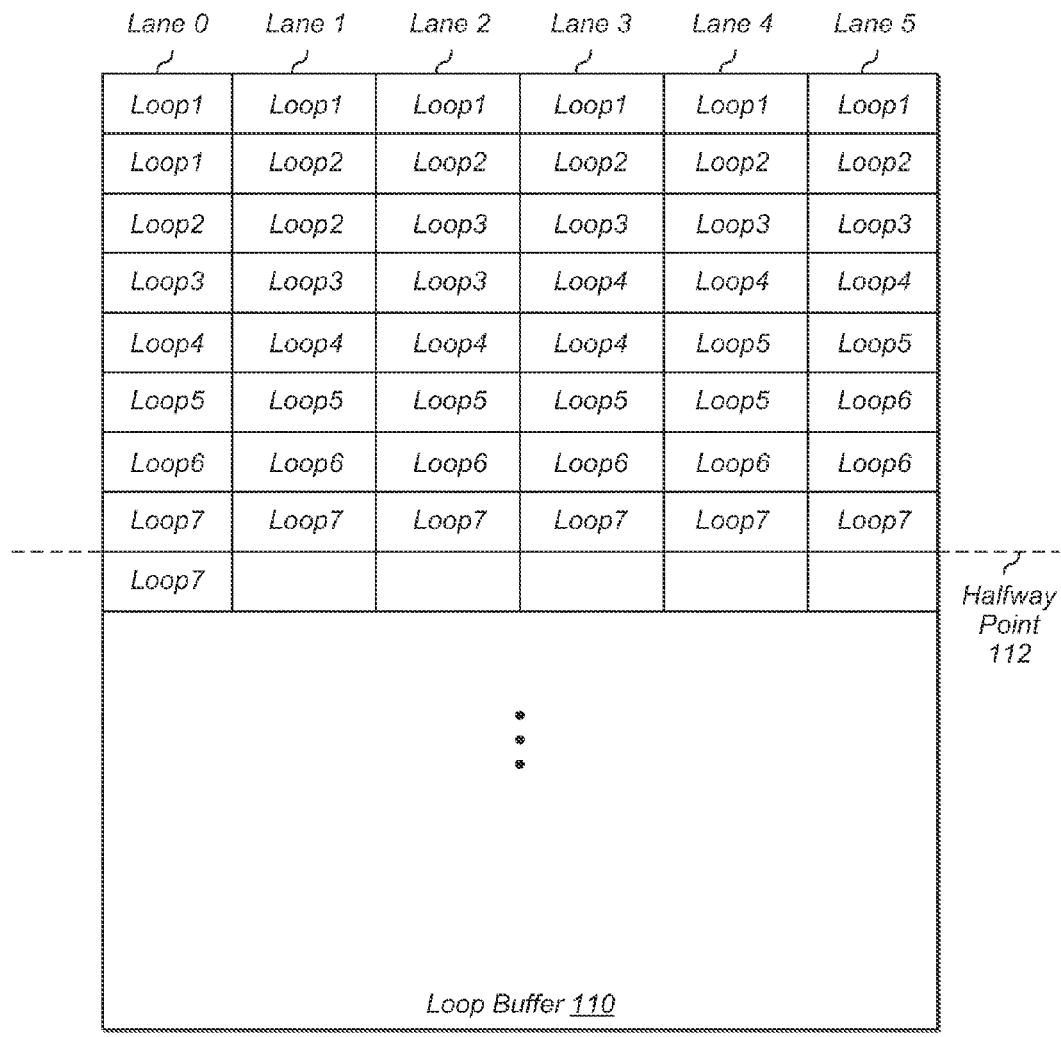
FIG. 7 illustrates one embodiment of multiple iterations of a loop cached in a loop buffer.

Turning now to FIG. 7, one embodiment of multiple iterations of a loop packed into a loop buffer is shown. In one embodiment, a loop may be seven uops long. The first iteration of the loop written to loop buffer 110 is labeled with "Loop1" for each uop of the loop and is shown in the first row and lane 0 of the second row within loop buffer 110. The second iteration of the loop, labeled "Loop2", may be written to loop buffer 110 picking up where the first iteration of the loop ended. The first uop of "Loop2" may be placed in an adjacent entry in the same row to the last uop of "Loop1". Furthermore, the first five uops of the second iteration of the loop may be written to lanes 1-5 of the second row of loop buffer 110 and the final two uops of the second iteration may be written to the third row of loop buffer 110. This pattern may continue for the next five iterations of the loop that are written to loop buffer 110. Each loop iteration written to loop buffer 110 is identical to the other loop iterations. In other words, each loop iteration contains the exact same uops as the other loop iterations written to loop buffer 110 and is indistinguishable from any other loop iteration.

As shown in FIG. 7, loop buffer 110 has 16 rows of entries, and the halfway point 112 is after the eighth row. In one embodiment, when an iteration of the loop is being written to loop buffer 110, when the last uop of the loop (i.e., the backwards taken branch) has been written to loop buffer 110, then the loop buffer control unit may check to see if the halfway point 112 has been reached. If the halfway point 112 has been reached, then no more iterations of the loop may be written to loop buffer 110. If the halfway point 112 has not been reached, then another iteration of the loop may be written to loop buffer 110.

In the example shown in FIG. 7, the average uops per cycle output from loop buffer 110 when the processor is in loop buffer mode will be approximately 5.4 uops per cycle throughput (49 uops in 9 cycles). This is an improvement in comparison to the average uops per cycle throughput of 3.5 uops for the example shown in FIG. 6.

Figure 8:
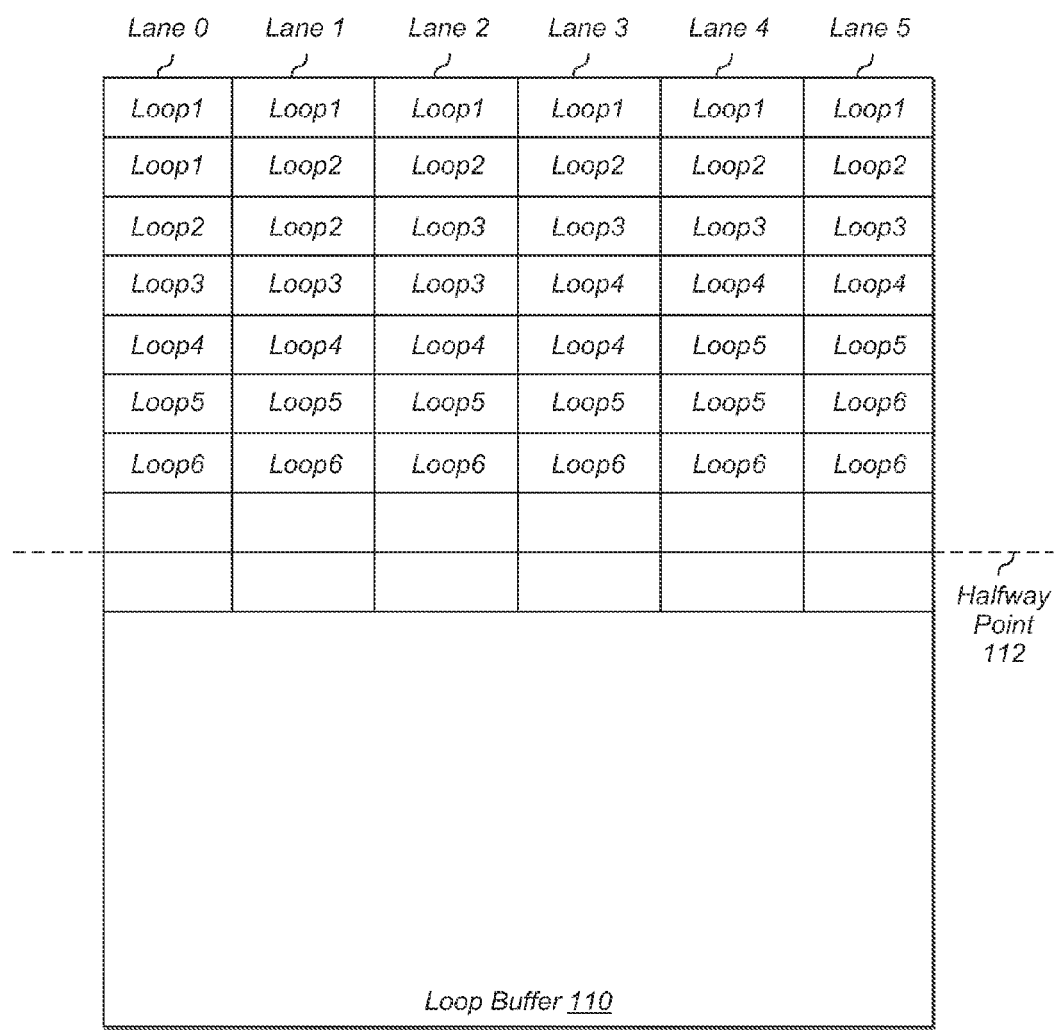
FIG. 8 illustrates another embodiment of multiple iterations of a loop cached in a loop buffer.

Referring now to FIG. 8, another embodiment of writing multiple iterations of a loop into a loop buffer is shown. In this embodiment, similar to the example shown in FIG. 7, multiple iterations of the loop may be written to loop buffer 110. However, in this embodiment, a separate condition may be checked when the end of a loop iteration is reached. The condition that may be checked may be whether the final uop of the loop iteration was written to the final lane (i.e., lane 5) of loop buffer 110. If this condition is met, then the writing of iterations of the loop to loop buffer 110 may be stopped. If this condition is not met, then it may be determined if the halfway point 112 has been reached. If halfway point 112 has been reached, then writing to loop buffer 110 may stop. If halfway point 112 has not been reached, then another iteration of the loop may be written to loop buffer 110.

Based on these conditions, six iterations of the seven-uop loop may be written to loop buffer 110. After the sixth iteration of the loop has been written to the loop, the last uop of the sixth iteration is written to lane 5 of the seventh row. Therefore, the uops per cycle output from loop buffer 110 will be maximized, and so no more iterations need to be written to loop buffer 110. Writing may stop even though halfway point 112 has not been reached yet.

It is noted that in other embodiments, the number of iterations to be written to the loop buffer may be determined prior to writing the iterations to the loop buffer. For example, detection of a loop and monitoring of the instructions may include counting a number of instructions or uops included in an iteration of the loop. Additionally, available space in the loop buffer may be known or determined. Based on the size of the loop iteration and available buffer storage, a calculation may be made as to how many iterations are written to the loop buffer. In various embodiments, the number of iterations to be written may be chosen so that maximum instruction throughput from the buffer is achieved. In other embodiments, additional constraints may be placed on how many iterations of the loop are written to the buffer. For example, no more than a given portion (e.g., half) of the buffer may be written. Numerous such alternatives are possible and are contemplated.

Utilizing these conditions may achieve a high uops per cycle throughput from loop buffer 110 when the processor is in loop buffer mode. In other embodiments, for other sizes of loops, these conditions may be utilized. For example, a loop with a size of nine uops would result in two iterations being written to loop buffer 110. The first three rows of loop buffer 110 would be filled, and then no more iterations of the nine-uop loop would be written to loop buffer 110. This would achieve a maximum possible throughput of six uops per cycle.

In other embodiments, other conditions may be utilized to determine whether or not to write another iteration of the loop to loop buffer 110. For example, in another embodiment, if the last uop of an iteration is written to either of the two rightmost slots of a row, then writing to loop buffer 110 may be terminated. In a further embodiment, the throughput may be calculated after a loop iteration is written to loop buffer 110 and then the throughput may be compared to a threshold. If the throughput is above the threshold, then writing to loop buffer 110 may be terminated. If the throughput is below the threshold, then another loop iteration may be written to loop buffer 110. These and other conditions may be used independently or combined in any suitable way in further embodiments.

Figure 9:
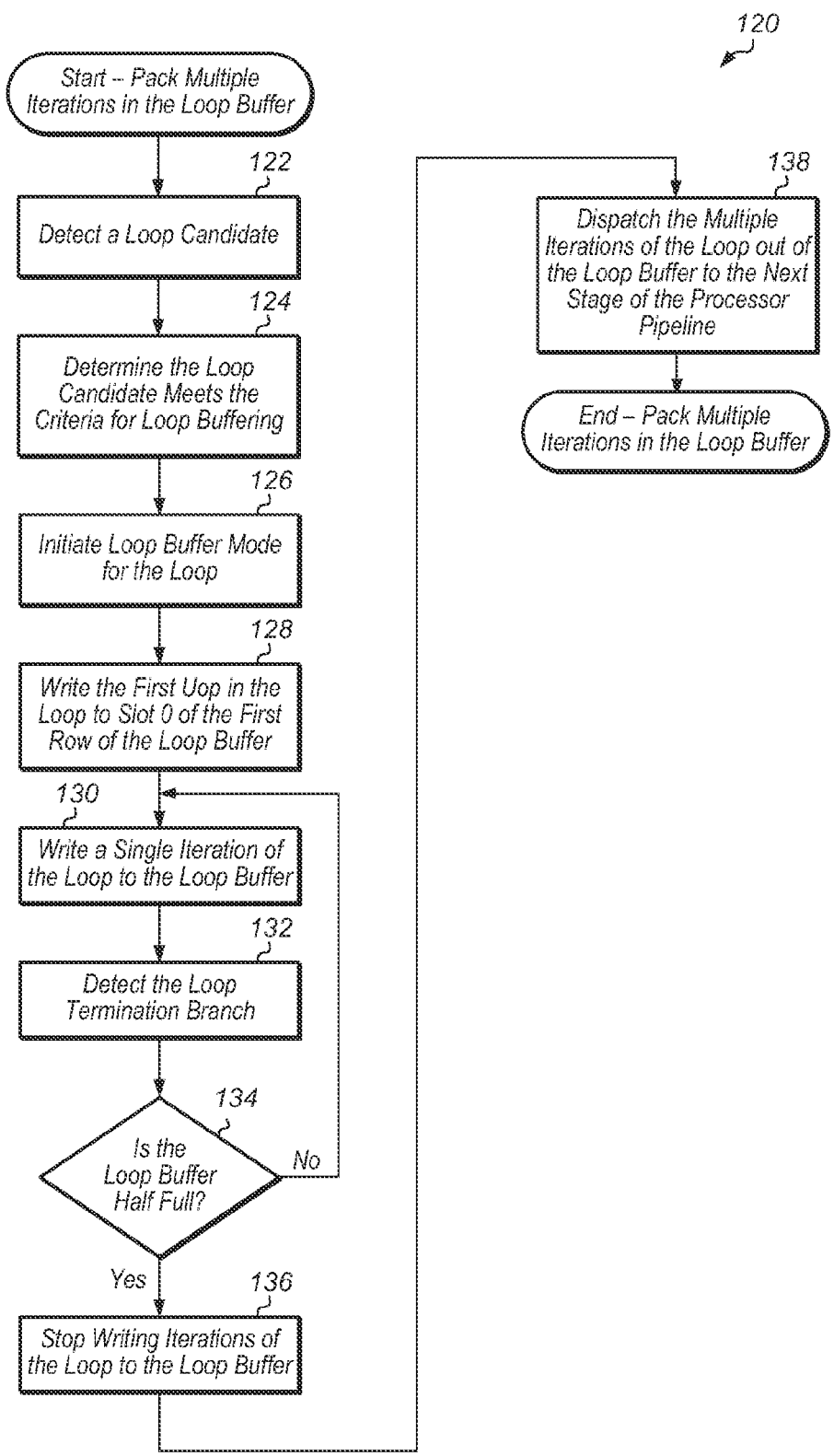
FIG. 9 is a generalized flow diagram illustrating one embodiment of a method for tracking a loop candidate.

Referring now to FIG. 9, one embodiment of a method 120 for packing multiple iterations of a loop in a loop buffer is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

In one embodiment, a loop candidate may be detected in the instruction stream (block 122). Then, a loop buffer control unit may determine that the loop candidate meets the criteria for loop buffering (block 124). A loop buffer control unit may then initiate loop buffer mode for the loop candidate (block 126). When loop buffer mode is initiated, the loop termination branch uop may be marked so that it may be identified as the end the loop. A loop termination branch may be defined as a direct backwards taken branch excluding subroutine calls. Also, the first uop of the loop, which is the next uop after the loop termination branch, may be marked as the loop start. The aligner of the fetch unit may stall after the loop termination branch so that the first uop in the loop is written to slot 0 of the first row of the loop buffer (block 128).

Next, a single iteration of the loop may be written to the loop buffer (block 130). As the iteration of the loop is being written to the loop buffer, the loop termination branch may be detected at the end of the iteration (block 132). In response to detecting the loop termination branch, the loop buffer control unit may check to see if the loop buffer is already hall full (conditional block 134). In one embodiment, the loop buffer control unit may monitor the write pointer to the loop buffer and see if the write pointer has passed the halfway point of the loop buffer.

If the loop buffer is less than half full (conditional block 134), then another iteration of the loop may be written to the loop buffer (block 130). For this iteration, the first uop (i.e., loop start) of the loop may be written to the next, adjacent slot after the loop termination branch of the previous iteration of the loop, which may be the same row of the loop buffer if the loop termination branch is located in any slot other than the rightmost slot of the row. This is in contrast to how the first iteration of the loop is written to the loop buffer. For the first iteration, the aligner may stall after the loop termination branch from the previous iteration so that the first uop of the first iteration if written to the first (or leftmost) slot of the first row of the loop buffer.

If the loop buffer is more than half full (conditional block 134), then the loop buffer control unit may signal to the front end to discontinue writing more iterations of the loop to the loop buffer (block 136). For the last iteration of the loop, the aligner of the fetch unit may be held up after dispatching the loop termination branch. In this way, there may be a clean handoff to dispatching uops out of the loop buffer when the processor goes into loop buffer mode. In addition, when the processor enters loop buffer mode, the uops in the instruction queue and instructions further upstream in the front-end of the processor pipeline may be flushed. After block 136, the loop buffer may dispatch the one or more iterations of the loop to the next stage of the processor pipeline (block 138). The front end of the processor may be shutdown while the loop is being dispatched out of the loop buffer.

In one embodiment, the number of rows (e.g., "CNT" in FIG. 3) that have been written to the loop buffer may be stored. The loop buffer control unit may use the stored number of valid rows to determine when there are no more valid rows to be read out of the loop buffer. For example, when rows of uops are dispatched to the next stage of the processor pipeline, a read pointer may step through the rows of the loop buffer, and the read pointer may get reset back to the top of the loop buffer when there are no more valid rows in the loop buffer as indicated by the stored number of valid rows.

After block 138, method 120 may end when the loop terminates. After the loop terminates, the front end may be turned back on, and the fetch unit may supply instructions to the rest of the processor pipeline.

Figure 10:
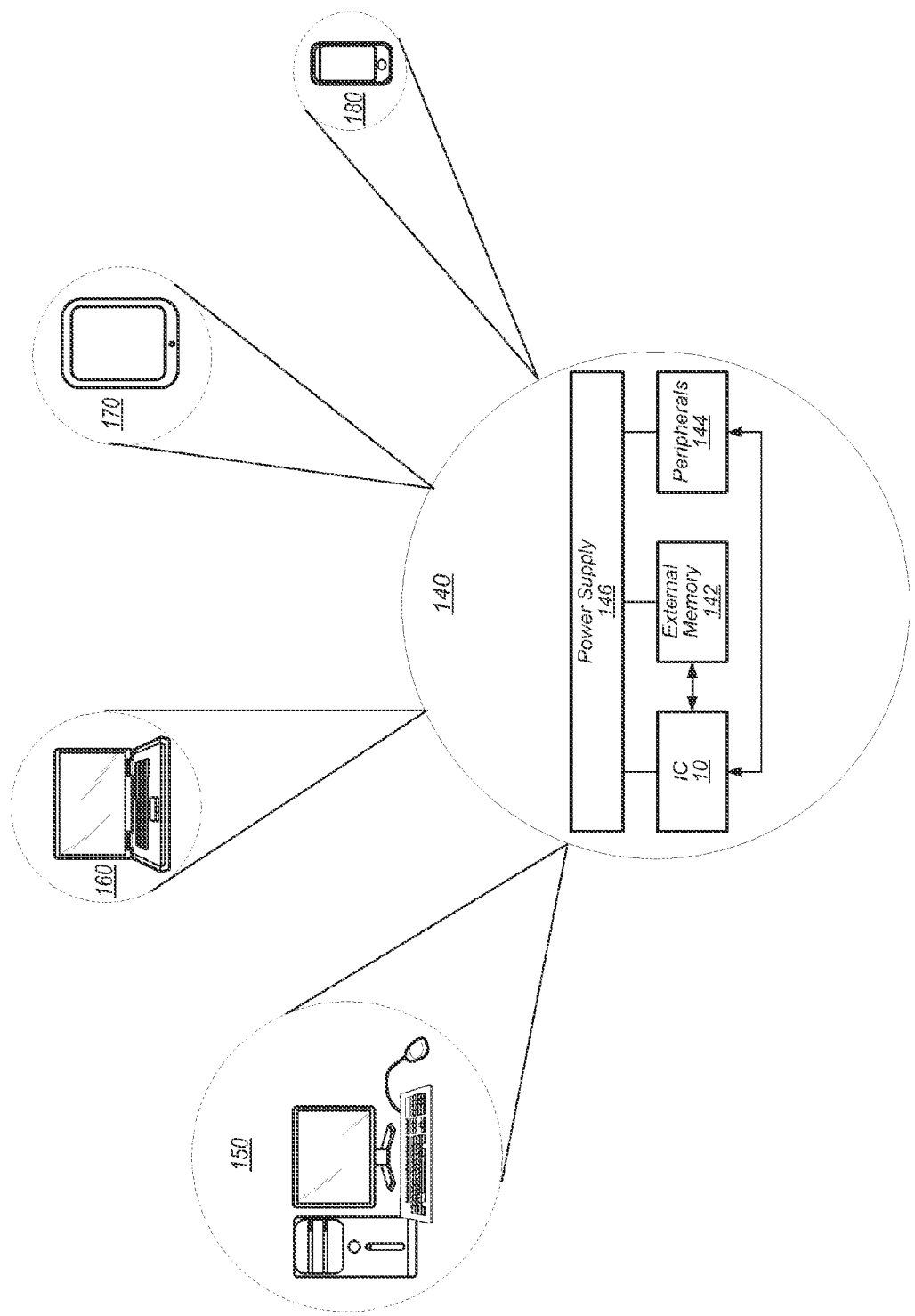
FIG. 10 is a block diagram of one embodiment of a system.

Referring next to FIG. 10, a block diagram of one embodiment of a system 140 is shown. As shown, system 140 may represent chip, circuitry, components, etc., of a desktop computer 150, laptop computer 160, tablet computer 170, cell phone 180, or otherwise. In the illustrated embodiment, the system 140 includes at least one instance of IC 10 (of FIG. 1) coupled to an external memory 142.

IC 10 is coupled to one or more peripherals 144 and the external memory 142. A power supply 146 is also provided which supplies the supply voltages to IC 10 as well as one or more supply voltages to the memory 142 and/or the peripherals 144. In various embodiments, power supply 146 may represent a battery (e.g., a rechargeable battery in a smart phone, laptop or tablet computer). In some embodiments, more than one instance of IC 10 may be included (and more than one external memory 142 may be included as well).

The memory 142 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc.

The peripherals 144 may include any desired circuitry, depending on the type of system 140. For example, in one embodiment, peripherals 144 may include devices for various types of wireless communication, such as wifi, Bluetooth, cellular, global positioning system, etc. The peripherals 144 may also include additional storage, including RAM storage, solid state storage, or disk storage. The peripherals 144 may include user interface devices such as a display screen, including touch display screens or multi-touch display screens, keyboard or other input devices, microphones, speakers, etc.

Figure 11:
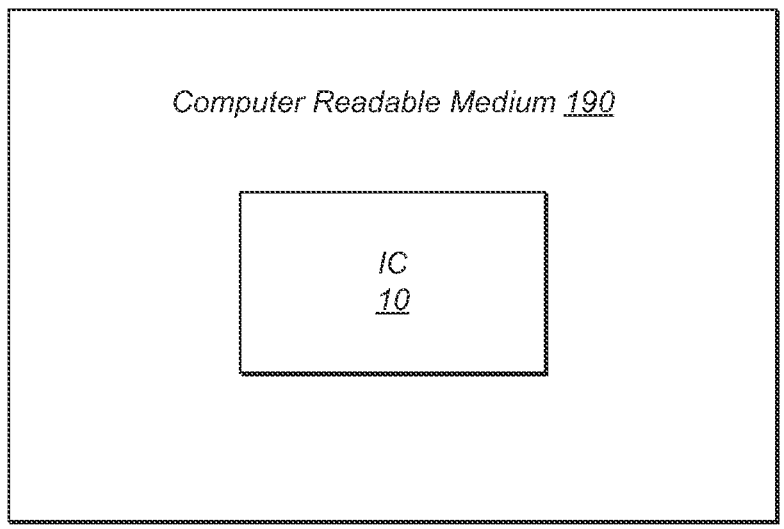
FIG. 11 is a block diagram of one embodiment of a computer readable medium.

Turning now to FIG. 11, one embodiment of a block diagram of a computer readable medium 190 including one or more data structures representative of the circuitry included in IC 10 (of FIG. 1) is shown. Generally speaking, computer readable medium 190 may include any non-transitory storage media such as magnetic or optical media, e.g., disk, CD-ROM, or DVD-ROM, volatile or non-volatile memory media such as RAM (e.g. SDRAM, RDRAM, SRAM, etc.), ROM, etc., as well as media accessible via transmission media or signals such as electrical, electromagnetic, or digital signals, conveyed via a communication medium such as a network and/or a wireless link.

Generally, the data structure(s) of the circuitry on the computer readable medium 190 may be read by a program and used, directly or indirectly, to fabricate the hardware comprising the circuitry. For example, the data structure(s) may include one or more behavioral-level descriptions or register-transfer level (RTL) descriptions of the hardware functionality in a high level design language (HDL) such as Verilog or VHDL. The description(s) may be read by a synthesis tool which may synthesize the description to produce one or more netlists comprising lists of gates from a synthesis library. The netlist(s) comprise a set of gates which also represent the functionality of the hardware comprising the circuitry. The netlist(s) may then be placed and routed to produce one or more data sets describing geometric shapes to be applied to masks. The masks may then be used in various semiconductor fabrication steps to produce a semiconductor circuit or circuits corresponding to the circuitry. Alternatively, the data structure(s) on computer readable medium 230 may be the netlist(s) (with or without the synthesis library) or the data set(s), as desired. In yet another alternative, the data structures may comprise the output of a schematic program, or netlist(s) or data set(s) derived therefrom.

While computer readable medium 190 includes a representation of IC 10, other embodiments may include a representation of any portion or combination of portions of IC 10 (e.g., loop buffer, loop buffer control unit, aligner).

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:
1. An apparatus comprising:
a loop buffer comprising a plurality of rows, each of said rows comprising a plurality of entries; and
a loop buffer control unit coupled to the loop buffer, wherein the loop buffer control unit is configured to:
detect a loop in an instruction stream;
cause two or more iterations of the loop to be written to the loop buffer;
store a given instruction in a rightmost entry of a row;

determine whether the given instruction is a backward taken branch;

in response to determining the given instruction is not a backward taken branch and the loop buffer is not at least halfway full, cause one or more additional iterations of the loop to be written to the loop buffer;

in response to determining the given instruction is a backward taken branch, prevent additional iterations of the loop from being written to the loop buffer; and dispatch all entries in a given row of the buffer concurrently.

2. The apparatus as recited in claim 1, wherein the loop buffer control unit is further configured to prevent additional iterations of the loop from being written to the loop buffer responsive to determining the loop buffer is at least halfway full.

3. The apparatus as recited in claim 1, wherein the loop buffer control unit is configured to determine if the loop buffer is halfway full based on a position of a write pointer to the loop buffer.

4. The apparatus as recited in claim 1, wherein a number of iterations of the loop written to the loop buffer is determined based on maximizing instruction operations per cycle throughput out of the loop buffer when the apparatus is in loop buffer mode.

5. The apparatus as recited in claim 1, further comprising an aligner configured to write a first instruction operation of a first iteration of the loop to a first slot in a first row of the loop buffer.

6. The apparatus as recited in claim 1, wherein the loop buffer is configured to dispatch instruction operations of the two or more iterations of the loop responsive to the apparatus entering loop buffer mode.

7. A processor comprising:
a fetch unit configured to identify and mark a start and an end of a loop in an instruction stream;
a loop buffer comprising a plurality of rows, each of said rows comprising a plurality of entries; and
a loop buffer control unit coupled to the loop buffer, wherein the loop buffer control unit is configured to detect a loop in an instruction stream;
wherein the loop buffer is configured to:
store an iteration of the loop, whereby a first entry of a row of the loop buffer is selected to store a start of the loop;
in response to determining a last operation of a loop iteration has been written to the loop buffer:
store another iteration of the loop in the loop buffer, in response to determining the loop buffer is not at least halfway full;
discontinue storing iterations of the loop in the loop buffer even though a remaining capacity of the loop buffer is adequate to store one or more additional iterations of the loop, in response to determining the loop buffer is at least halfway full;
store an end of the loop in an entry of a given row of the loop buffer;
stall after detecting the end of the loop, such that one or more entries of the given row remain unfilled; and
dispatch instructions of the multiple iterations of the loop responsive to the processor entering a loop buffer mode.

8. The processor as recited in claim 7, wherein each iteration of the multiple iterations of the loop is identical.

9. The processor as recited in claim 7, wherein the fetch unit comprises an aligner configured to identify loop iteration boundaries.

10. The processor as recited in claim 9, wherein the aligner is further configured to cause a stall after detecting a backwards taken branch of a previous iteration of the loop responsive to the processor entering loop buffer mode.

11. The processor as recited in claim 7, wherein the end of the loop corresponds to a backwards taken branch.

12. The processor as recited in claim 11, wherein the aligner is further configured to:
assign a backwards taken branch of a first iteration of the loop to a first slot in a first clock cycle; and
assign a first instruction operation of a second iteration of the loop to a second slot in the first clock cycle, wherein the second slot is adjacent to the first slot.

13. A method comprising:
detecting a loop candidate in an instruction stream;
determining the loop candidate meets the criteria for buffering in a loop buffer, the loop buffer comprising a plurality of rows, each of said rows comprising a plurality of entries;
writing a first iteration of the loop candidate to the loop buffer;
storing a given instruction in a rightmost entry of a row;
determining whether the given instruction is a backward taken branch;
in response to determining the given instruction is not a backward taken branch and the loop buffer is not at least halfway full, cause one or more additional iterations of the loop to be written to the loop buffer;
in response to determining the given instruction is a backward taken branch, prevent additional iterations of the loop from being written to the loop buffer; and
dispatching all entries in a given row of the buffer concurrently.

14. The method as recited in claim 13, the method further comprising preventing additional iterations of the loop from being written to the loop buffer responsive to determining the loop buffer is at least halfway full.

15. The method as recited in claim 14, the method further comprising shutting down a fetch unit responsive to dispatching the instructions of the loop candidate from the loop buffer.

16. The method as recited in claim 15, further comprising storing a first value equal to a number of valid rows stored in the loop buffer.

17. The method as recited in claim 16, wherein dispatching the instructions of the loop candidate from the loop buffer comprises stepping a read pointer through a number of rows of the loop buffer equal to the first value.

18. The method as recited in claim 17, further comprising resetting the read pointer to a first row of the loop buffer responsive to the read pointer stepping through a number of rows of the loop buffer equal to the first value.

* * * * *